Jan. 13, 1953  D. G. DALBY ET AL  2,625,279
VEHICLE LIFT FOR WRECKING TRUCKS
Filed May 10, 1950  2 SHEETS—SHEET 1

Delbert G. Dalby
Morris E. Smith
INVENTORS

BY Clarence A. O'Brien
and Harvey B. Jackson
Attorneys

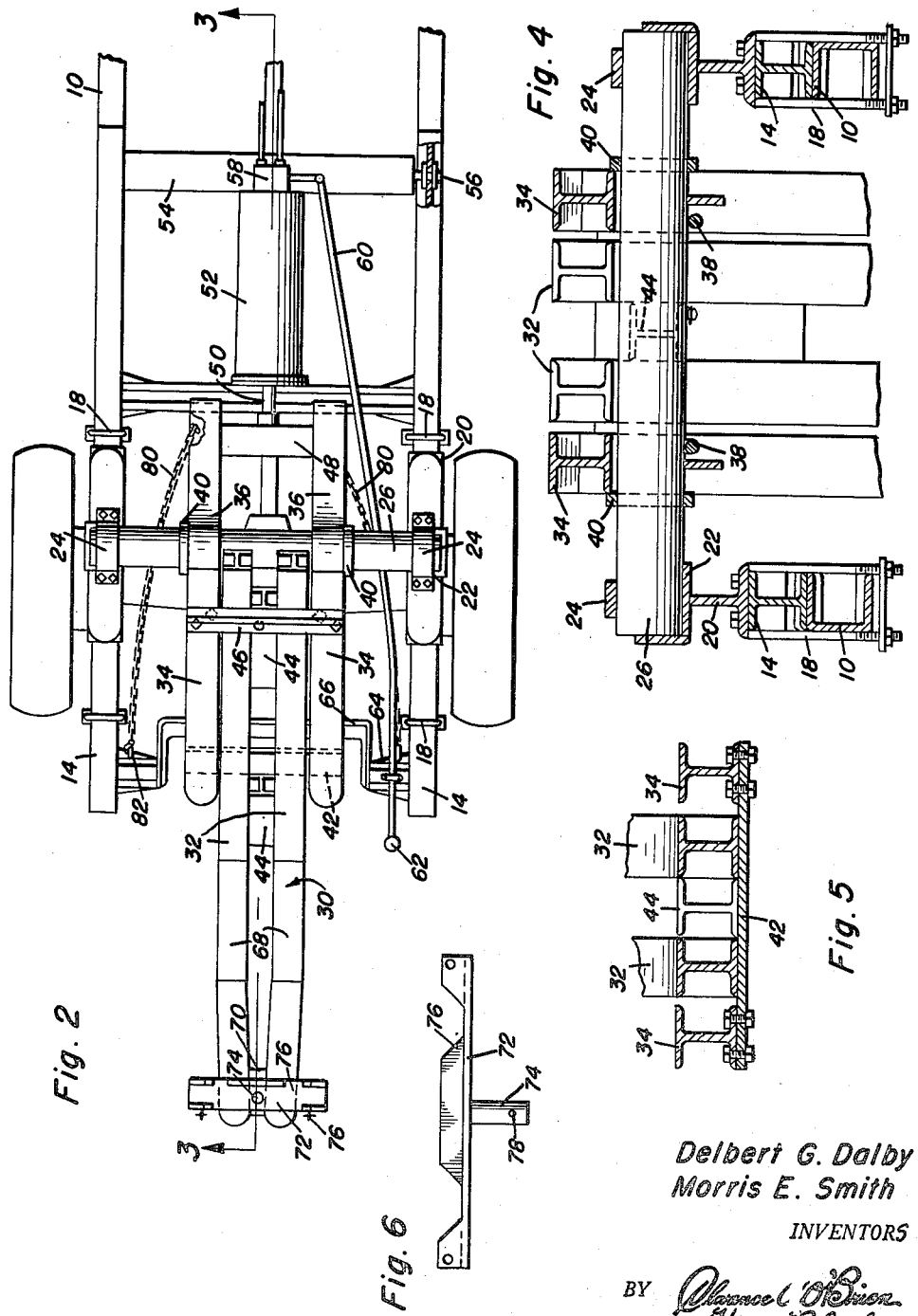

Patented Jan. 13, 1953

2,625,279

UNITED STATES PATENT OFFICE 2,625,279

VEHICLE LIFT FOR WRECKING TRUCKS

Delbert G. Dalby and Morris E. Smith, Amarillo, Tex.

Application May 10, 1950, Serial No. 161,122

2 Claims. (Cl. 214—86)

This invention relates generally to a towing vehicle and more particularly to a lift boom assembly capable of being mounted on the rear end portion of a frame of a motor vehicle.

A primary object of this invention is to provide means for handling incapacitated motor vehicles with a minimum of damage thereto while the same are being hauled, the device being capable of raising either the front or rear end of a wrecked automobile, whether this automobile be of modern or older type, and vehicles of various types of axles and fenders can be handled equally well.

Another object of this invention is to provide a towing vehicle construction which makes the handling of incapacitated automobiles relatively safe, the towing vehicle being easily handled while transporting the damaged vehicle since the tow bar or axle engaging yoke is pivotally mounted upon the rear end of the boom, so that the towed vehicle can track properly behind the towing vehicle.

A last object to be specifically mentioned is to provide a device of this character which is relatively inexpensive and practicable to manufacture, which is simple as well as safe to operate under various conditions, and which will give generally efficient and durable service.

With these objects definitely in view, this invention resides in certain novelty in the construction, combination and arrangement of elements and portions and will be hereinafter described in detail in the specification, and particularly pointed out in the appended claims, and illustrated in the accompanying drawings which form a material part of this application, and in which:

Figure 2 is a top plan view of the structure shown in Figure 1;

Figure 4 is a vertical transverse sectional view taken on the line 4—4 of Figure 3;

Figure 5 is a vertical transverse sectional view taken on the line 5—5 of Figure 3;

Figure 6 is an elevational view of the axle engaging yoke removed from the boom.

Similar characters of reference designate similar or identical portions throughout the specification and throughout the different views of the drawings.

Figure 1:
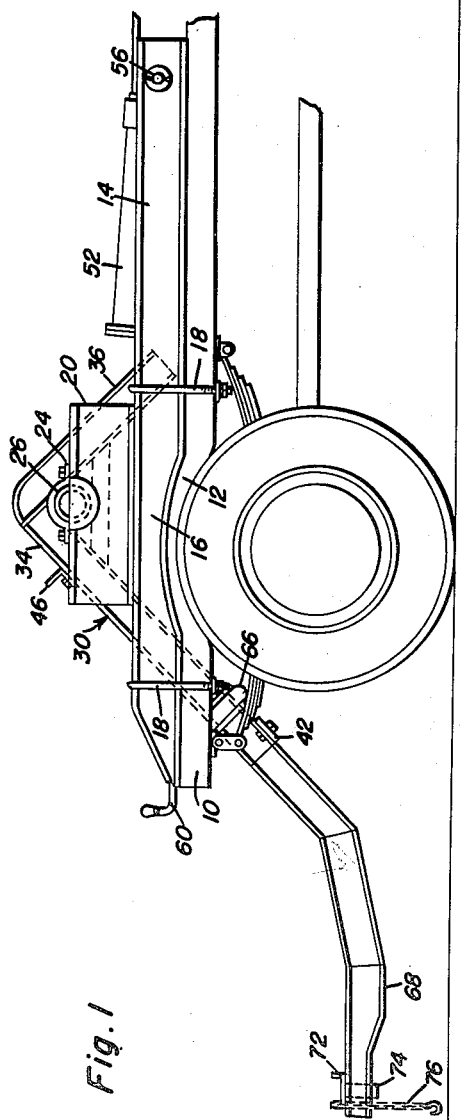
Figure 1 is a side elevational view of the rear end of the towing vehicle with this invention incorporated thereon.

Referring now to the drawings in detail, this invention consists of vehicle frame members 10, which will ordinarily have upwardly arched portions 12 over the rear wheels of the vehicle, and horizontal lateral frame members 14, having correspondingly upwardly arched portions 16, and rigidly and removably secured to the vehicle frame members 10, by means of U-bolts 18. The vehicle frame members are illustrated as of channel form and the members 14 are preferably of I-beam construction. Sleeper blocks 20 are rigidly secured to the upper surfaces of the lateral frame members 14 and the sleeper blocks carry journal seats 22 which coact with bearing caps 24 in rotatably mounting a rocker bar 26 transversely of the towing vehicle, this rocker bar being shown in the drawings as tubular.

A boom generally indicated by the reference numeral 30 is comprised of a pair of spaced I-beams 32, rigidly secured to and between a pair of inverted V-shaped members, to move therewith, one pair of arms 36 of these V-shaped members comprising what will be hereinafter referred to as a lever arm. The apices of the V-shaped members 34 are rigidly secured to the rocker bar 26 by U-bolts 38, or otherwise if desired, and collars 40 are rigidly secured on the rocker bar 26 to prevent any possible movement of the boom 30 longitudinally of the rocker bar 26. A transversely disposed link 42 will be secured across the under side of an intermediate portion of the boom 30 and spacer members 44, represented as being of I-beam construction, are rigidly secured to and between intermediate and upper end portions of the boom 30. In this regard, an angle plate 46 will also be rigidly secured to the members 32 and 34 adjacent the rocker bar 26, and it will be understood that the members 32, 34 and 36 are thus rigidly secured together, the above mentioned lever arm construction being completed by the provision of the transverse member 48 rigidly secured to and between the depending arms 36.

The transverse member 48 is pivotally connected to the outer end of a piston 50 operated by a hydraulic cylinder 52, the cylinder 52 being mounted on a transverse member 54 which is pivotally supported, as indicated at 56, upon the lateral frame members 14, near the forward end of the latter. A valve control 58 for the hydraulic cylinder 52 is operated by a push rod 60 terminating in a handle 62 at the rear end of one of the lateral frame members 14, the push rod being illustrated as slidably mounted on a transverse member 64 rigidly secured to and between the said rear end of the lateral frame members 14. It should be particularly noted that the transverse member 64 has a depressed central portion 66 which acts as a seat for the boom 30 when the latter is in depressed or lowered position. This construction also serves to provide ample clearance for the boom, while serving as a safety feature.

Figure 3:
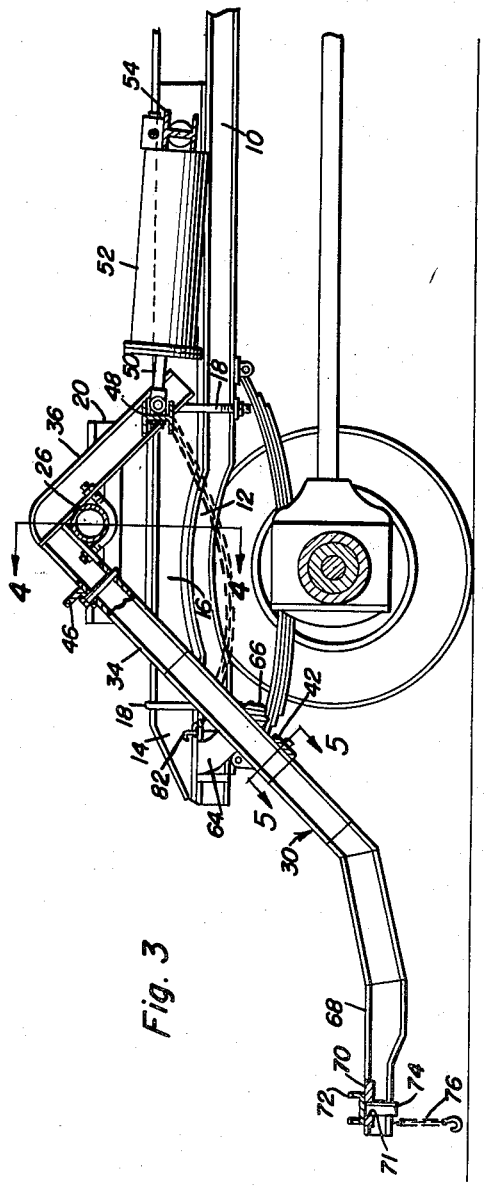
Figure 3 is a longitudinal central sectional view taken substantially upon the line 3—3 of Figure 2.

The boom 30 includes rearwardly extending portions 68 having a spacer block 70 rigidly secured to and between the rear extremities thereof, this spacer block having a vertical bore 71, indicated in Figure 3, and an axle engaging yoke 72 has a depending pivot pin 74 removably securable in this bore 71 so that the yoke 72 can pivot about a substantially vertical axis when the towing vehicle is in transit with a towed vehicle mounted thereon. Chains 76 are terminally secured to the yoke 72 for securing the axle or other desired portion of the towed vehicle on the yoke, while an aperture 78 is provided in the pivot pin 74 to permit a keeper, if desired, to be inserted therein for positively preventing removal of the yoke from the boom. Chains 80 are secured at one end to the lower ends of the lever arm members 36 and are adjustably connected to hooks 82 on the transverse member 64 as a safety lock for the boom in raised position.

The operation of this invention will be clearly understood from a consideration of the foregoing description of the mechanical details thereof, taken in connection with the drawings and with the above recited objects. It will be clear that all the objects mentioned are amply achieved by this invention. Further description would appear to be unnecessary.

Having described the invention, what is claimed as new is:

1. In a towing vehicle including a pair of side beams, a frame having horizontal lateral frame members and a transverse frame member secured to and between the rear ends of said lateral frame members, said lateral frame members overlying said beams and being detachably secured thereto, a rocker bar extending between said lateral frame members, means mounted on said lateral frame members rotatably supporting the ends of the rocker bar, a pair of spaced parallel V-shaped members having their apices secured to the rocker bar, said V-shaped members each including a forward leg and a rear leg, a pair of spaced parallel lever arms disposed between and rigidly secured to the rear legs of said V-shaped members, said arms having forward ends overlying and resting against said rocker bar, said transverse frame member including a depressed central portion forming a seat for the rear legs of said V-shaped members and intermediate portions of said arms when the rear legs of the V-shaped members are lowered, and a hydraulic cylinder mounted on said frame and having a piston rod operatively connected to the forward legs of said V-shaped members.

2. In a towing vehicle including a pair of side beams, a frame having horizontal lateral frame members and a transverse frame member secured to and between the rear ends of said lateral frame members, said lateral frame members overlying said beams and being detachably secured thereto, a rocker bar extending between said lateral frame members, means mounted on said lateral frame members rotatably supporting the ends of the rocker bar, a pair of spaced parallel V-shaped members having their apices secured to the rocker bar, said V-shaped members each including a forward leg and a rear leg, a pair of spaced parallel lever arms disposed between and rigidly secured to the rear legs of said V-shaped members, said arms having forward ends overlying and resting against said rocker bar, said transverse frame member including a depressed central portion forming a seat for the rear legs of said V-shaped members and intermediate portions of said arms when the rear legs of the V-shaped members are lowered, a forward transverse frame member having ends rotatably secured to the forwards ends of said lateral frame members, a hydraulic cylinder supported on said forward transverse frame member and including a piston rod operatively connected to the forward legs of said V-shaped members, a valve control for the cylinder, and a push rod slidably secured to the first named transverse frame member and connected to the valve control.

DELBERT G. DALBY.
MORRIS E. SMITH.

REFERENCES CITED

The following references are of record in the file of this patent:

UNITED STATES PATENTS

| Number | Name | Date |
| --- | --- | --- |
| 2,032,654 | Ferrier | Mar. 13, 1936 |
| 2,067,954 | Tetrault | Jan. 19, 1937 |
| 2,111,341 | Tetrault | Mar. 15, 1938 |
| 2,433,598 | Chadwick | Dec. 30, 1947 |
| 2,470,857 | Lathers | May 24, 1949 |
| 2,512,733 | Andersen et al. | June 27, 1950 |

FOREIGN PATENTS

| Number | Country | Date |
| --- | --- | --- |
| 558,525 | Germany | Sept. 8, 1932 |